(12) United States Patent
Wadhva

(10) Patent No.: US 10,539,215 B2
(45) Date of Patent: Jan. 21, 2020

(54) CROSS-SHAFT FOR THREE PINION DIFFERENTIAL

(71) Applicant: Eaton Corporation, Cleveland, OH (US)

(72) Inventor: Ashish Wadhva, Maharastra (IN)

(73) Assignee: Easton Corporation, Cleveland, OH (US)

(*) Notice: Subject to any disclaimer, the term of this patent is extended or adjusted under 35 U.S.C. 154(b) by 68 days.

(21) Appl. No.: 15/723,678

(22) Filed: Oct. 3, 2017

(65) Prior Publication Data

US 2018/0023677 A1 Jan. 25, 2018

Related U.S. Application Data

(63) Continuation of application No. PCT/US2016/024433, filed on Mar. 28, 2016.

(30) Foreign Application Priority Data

Apr. 3, 2015 (IN) .............................. 955/DEL/2015

(51) Int. Cl.
  *F16H 48/08* (2006.01)
  *F16H 48/40* (2012.01)
  *F16H 48/38* (2012.01)

(52) U.S. Cl.
  CPC ............ *F16H 48/08* (2013.01); *F16H 48/40* (2013.01); *F16H 48/38* (2013.01); *F16H 2048/085* (2013.01); *F16H 2048/087* (2013.01)

(58) Field of Classification Search
  CPC .... F16H 48/38; F16H 48/40; F16H 2048/087; F16H 2048/085
  See application file for complete search history.

(56) References Cited

U.S. PATENT DOCUMENTS 2,200,153 A * 5/1940 Bush ..................... F16H 48/08
                                                              475/221
3,049,942 A * 8/1962 Kohler ................... F16H 48/08
                                                              475/236

(Continued)

FOREIGN PATENT DOCUMENTS

| EP | 1555459 A1 | 7/2005 |
| JP | 2012145206 A | 8/2012 |
| WO | 2004076891 A1 | 9/2004 |

OTHER PUBLICATIONS

International Search Report and Written Opinion for International Application No. PCT/US2016/024433 dated Jun. 30, 2016, 15 pages.

(Continued)

*Primary Examiner* — Timothy Hannon
(74) *Attorney, Agent, or Firm* — RMCK Law Group PLC

(57) ABSTRACT

A differential gear mechanism includes a differential case, a first and second side gear, a first, second and third pinion gear and a center block. The differential case can define a first, second and third counterbore formed therearound. The differential case rotates around an axis of rotation. Each cross-pin can have a cylindrical pin body that extends between first and second ends. The first, second and third pinion gears intermesh with the first and second side gears to form a torque transfer arrangement. The center block can have a cylindrical body that defines a first, second and third locating feature thereon. The center block can be disposed between the first and second side gears. Each first end of a respective cross-pin is received by a corresponding counterbore of the differential case. Each second end is received by a corresponding locating feature of the center block.

19 Claims, 3 Drawing Sheets

(56) References Cited

U.S. PATENT DOCUMENTS

| | | | | | |
|---|---|---|---|---|---|
| 3,052,137 | A | * | 9/1962 | Russell | F16H 48/08 475/234 |
| 3,109,323 | A | * | 11/1963 | Saurer | F16H 48/08 475/88 |
| 3,232,139 | A | * | 2/1966 | Nickell | F16H 48/08 475/88 |
| 3,893,351 | A | * | 7/1975 | Baremor | F16H 48/08 475/232 |
| 4,183,263 | A | * | 1/1980 | Osenbaugh | F16H 48/08 475/160 |
| 4,363,248 | A | * | 12/1982 | Brisabois | F16H 48/08 475/230 |
| 4,860,614 | A | * | 8/1989 | Erdmann | F16H 48/08 475/246 |
| 5,186,694 | A | * | 2/1993 | Cooper | F16H 48/08 475/220 |
| 5,507,702 | A | | 4/1996 | Joachim et al. | |
| 7,081,065 | B2 | * | 7/2006 | Sudou | F16H 48/08 475/230 |
| 2004/0157696 | A1 | * | 8/2004 | Saito | F16H 48/08 475/230 |
| 2005/0070394 | A1 | | 3/2005 | Sugeta et al. | |
| 2006/0287156 | A1 | * | 12/2006 | Nakajima | F16H 48/08 475/230 |
| 2007/0191171 | A1 | * | 8/2007 | Pascoe | B21K 21/02 475/230 |
| 2009/0075777 | A1 | * | 3/2009 | Han | F16H 48/08 475/230 |
| 2014/0141921 | A1 | | 5/2014 | Fox et al. | |
| 2014/0179482 | A1 | * | 6/2014 | Uchida | F16H 48/38 475/220 |

OTHER PUBLICATIONS

European Search Report for EP Application No. 16773899.6 dated Oct. 25, 2018, 10 pages.

* cited by examiner

CROSS-SHAFT FOR THREE PINION DIFFERENTIAL

CROSS-REFERENCE TO RELATED APPLICATION

This application is a continuation of International Application No. PCT/US2016/024433 filed Mar. 28, 2016, which claims the benefit of Indian Patent Application No. 955/DEL/2015 filed on Apr. 3, 2015. The disclosure of the above application is incorporated herein by reference.

FIELD

The present disclosure relates generally to differential gear assemblies and more particularly to a cross-shaft configuration for a three pinion differential.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross-pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A differential gear mechanism constructed in accordance to one example of the present disclosure includes a differential case, a first and second side gear, a first, second and third pinion gear and a center block. The differential case can define a first, second and third counterbore formed therearound. The differential case rotates around an axis of rotation. The first and second side gears can be rotatably mounted within the differential case. The first and second side gears can be co-axially aligned along the axis of rotation. The first, second and third pinion gear can be mounted between the first and second side gears. Each of the first, second and third pinion gears can be rotatably mounted on a respective cross-pin. Each cross-pin can have a cylindrical pin body that extends between first and second ends. The first, second and third pinion gears intermesh with the first and second side gears to form a torque transfer arrangement configured for transferring torque between the pinion gears and the first and second side gears to rotate the first and second side gears about the axis of rotation. The center block can have a cylindrical body that defines a first, second and third locating feature thereon. The center block can be disposed between the first and second side gears. Each first end of a respective cross-pin is received by a corresponding counterbore of the differential case. Each second end is received by a corresponding locating feature of the center block.

The first, second and third locating feature comprises first, second and third slots formed into the cylindrical block body. The respective slots each extend a length of the cylindrical block body. The differential case can further define first, second and third holes coaxially arranged relative to the respective first, second and third counterbores. Each of the first, second and third holes extend through an outer surface of the differential case. The torque transfer arrangement can be configured for allowing the first and second side gears to rotate at different rotational speeds with respect to one another about the axis of rotation.

According to other features, each cylindrical pin body has a spiral groove formed thereon. The differential case can further define a first, a second and a third window positioned at a diametrically opposed location from a corresponding first, second and third hole in the differential case. The locating features in the center block are each defined in part by opposing side walls that oppose the respective second ends of the cross-shafts in a keyed relationship. The center block can be retained between the side gears.

A differential gear mechanism according to another example of the present disclosure includes a differential case, a first and a second side gear and a center block. The differential case defines first, second and third holes and corresponding first, second and third counterbores formed therearound. The differential case can rotate around an axis of rotation. The first and second side gear can be rotatably mounted within the differential case. The first and second side gears can be co-axially aligned along the axis of rotation. The first, second and third pinion gear can be mounted between the first and second side gears. Each of the first, second and third pinion gears can be rotatably mounted on a respective cross-shaft. Each cross-shaft can have a cylindrical pin body that extends between first and second ends. The first, second and third pinion gears can intermesh with the first and second side gears to form a torque transfer arrangement configured for transferring torque between the pinion gears and the first and second side gears to rotate first and second side gears about the axis of rotation. The torque transfer arrangement can also be configured for allowing the first and second side gears to rotate at different rotational speeds with respect to one another about an axis of rotation. The center block can have a cylindrical block body that defines a first, second and third slot thereon. The center block can be disposed between the first and second side gears. Each first end of a respective cross-pin can be received by a corresponding counterbore of the differential case. Each second end can be received by a corresponding slot of the center block.

According to additional features, each cylindrical pin body has a spiral groove formed thereon. The differential case can further define a first, a second and a third window positioned at a diametrically opposed location from a corresponding first, second and third hole in the differential case. The first, second and third window can be configured to allow tool access to the differential case during formation of the first, second and third counterbores.

According to still other features, the slots in the center block are each defined in part by opposing side walls that oppose the respective second ends of the cross-shafts. The cross-shafts can be keyed to the center block at the respective slots. The center block can be retained between the side gears. The respective slots can each extend a length of the cylindrical block body. Each of the first, second and third holes can extend through an outer surface of the differential case. Each respective second end has a generally rectangular geometry.

BRIEF DESCRIPTION OF THE DRAWINGS

The present disclosure will become more fully understood from the detailed description and the accompanying drawings, wherein.

DETAILED DESCRIPTION

Figure 1:
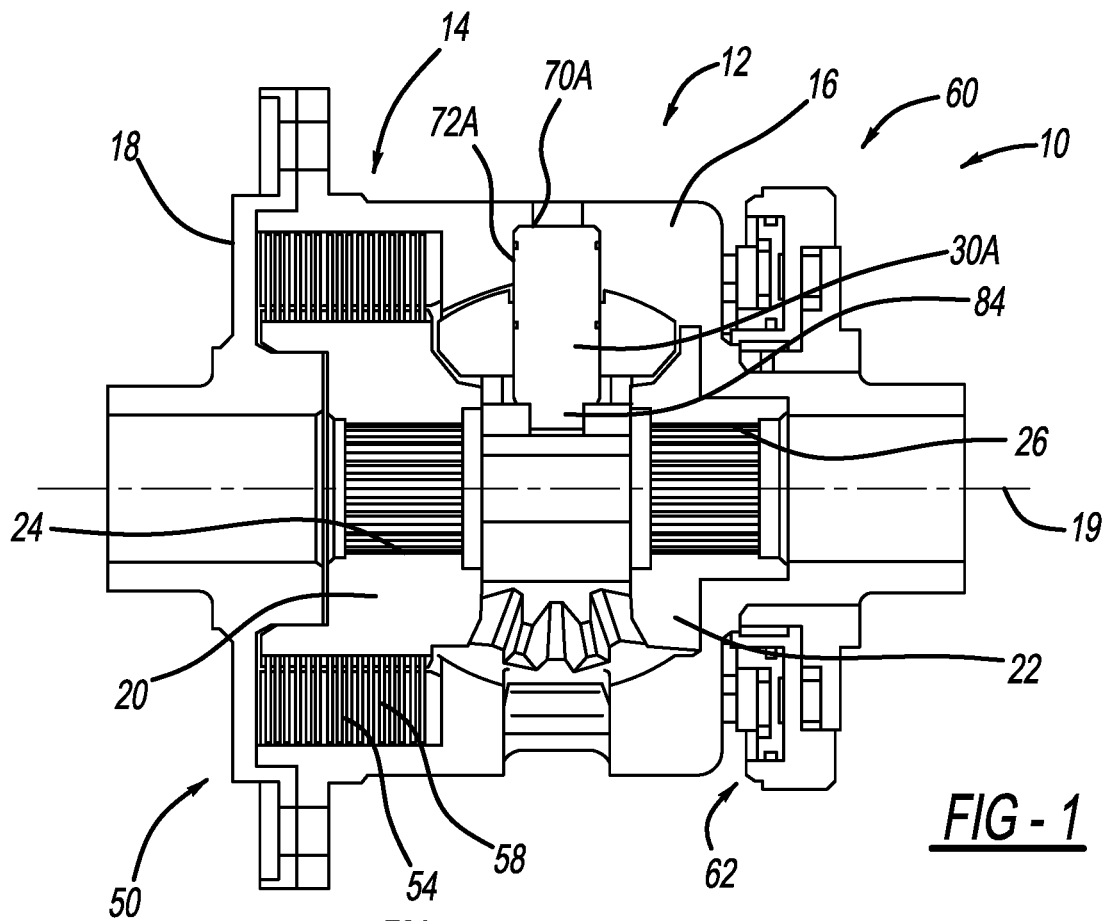
FIG. 1 is cross sectional view of a differential gear mechanism having a three pinion configuration and constructed in accordance to one example of the present disclosure.
Figure 2:
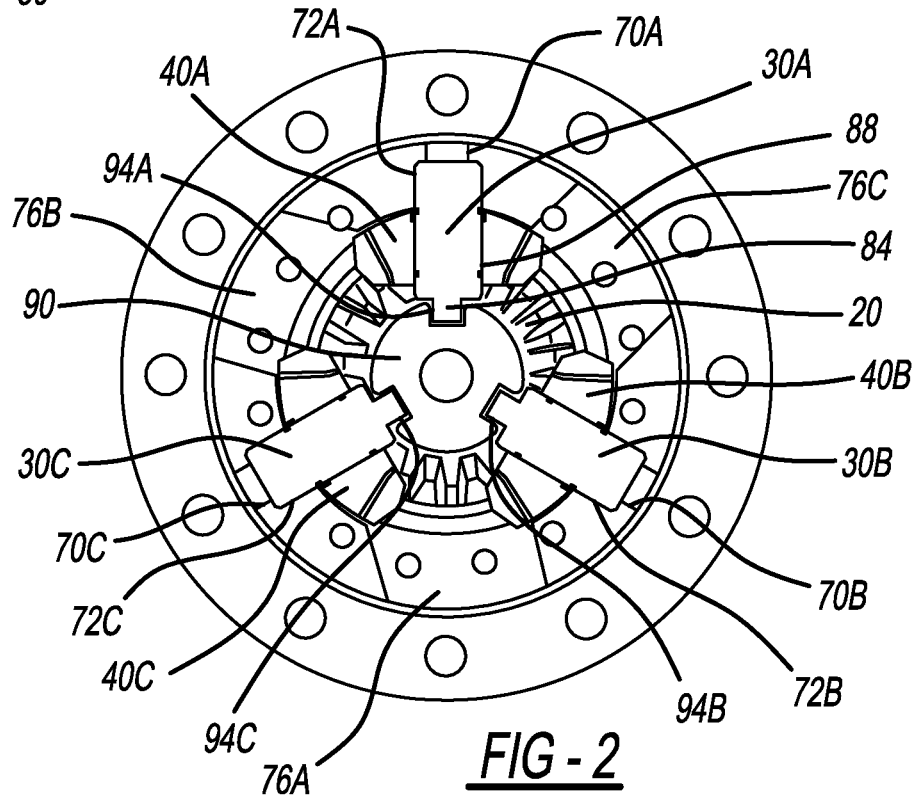
FIG. 2 is transverse cross sectional view taken from a cross-shaft hole center line.

With initial reference to FIGS. 1 and 2, a limited slip differential assembly constructed in accordance to one example of the present disclosure is shown and generally identified at reference numeral 10. The limited slip differential assembly 10 can include a differential gear assembly or mechanism 12 and a clutch assembly 14. The differential gear mechanism 12 includes a differential case 16 and a differential cover portion 18. The limited slip differential assembly 10 operates to drive a pair of axle shafts that are connected to drive wheels (not specifically shown). In general, the limited slip differential assembly 10 functions as a traditional open differential during normal operating conditions until an event occurs where a bias torque is required. When a loss in traction is detected or anticipated, the clutch assembly 14 can be selectively actuated in order to generate the optimum bias ratio for the situation. The differential case is configured to rotate around an axis of rotation 19.

The differential gear assembly 12 includes a pair of side gears 20 and 22 that are mounted for rotation with the axle shafts (and first and second drive wheels), respectively. The side gears 20 and 22 define first and second axle shaft openings 24 and 26 (FIG. 2). Three cross-pins or cross-shafts 30A, 30B and 30C are fixedly mounted to the first differential case portion 16 for rotation therewith. The cross-pins or cross-shafts 30A, 30B and 30C can also be referred to in the art as pinion gear shafts. A corresponding three pinion gears 40A, 40B and 40C are mounted for rotation with the cross-shafts 30A, 30B and 30C and are in meshing relationship with both of the side gears 20 and 22. In an open configuration, described more fully below, the differential gear assembly 12 acts to allow the axle shafts to rotate at different speeds.

The clutch assembly 14 can include a clutch pack 50 and a clutch actuator 52. The clutch pack 50 includes a plurality of annular plates 54 interleaved between a plurality of annular friction disks 58. The plurality of annular plates 54 can be coupled for rotation with one of the differential case 16 and the differential gear assembly 12. The plurality of annular friction disks 58 can be coupled for rotation with the other one of the differential case 16 and the differential gear assembly 12. In the illustrated example, the plurality of annular plates 54 are coupled for rotation to the differential case 16 (e.g., splined to an inner diameter of the differential case 16) and the plurality of annular friction disks 58 are coupled for rotation with the differential gear assembly 12 (e.g., splined to an outer diameter of the side gear 20). It will be appreciated that the annular friction disks 58 may be supported for rotation by either of the side gears 20 or 22, or both. It is further appreciated that the clutch assembly 14 may be configured differently. It will further be appreciated that the differential gear assembly 12 may be provided without a clutch assembly.

The plurality of annular plates 54 and annular friction disks 58 are interleaved between one another and act to rotate past one another in substantially non-contacting relationship when the clutch assembly 14 is in its open position. However, it will be appreciated by those skilled in the art that the term "non-contacting" as used herein is relative and is not meant to necessarily indicate that the annular plates 54 and annular friction disks 58 have absolutely no contact when the clutch assembly 14 is in the open condition.

The annular plates 54 and annular friction disks 58 are axially movable into frictional engagement relative to one another, thereby reducing relative rotation between the annular plates 54 and annular friction disks 58 when the clutch assembly 14 is in the closed or partially closed configurations. In this manner, when the clutch assembly 14 is in its closed position, the side gears 20 and 22, as well as the axle shafts and the drive wheels rotate together.

The clutch assembly 14 can operate in an open configuration to allow the side gears 20 and 22 to rotate independently from each other, e.g., at different speeds. The clutch assembly 14 can also operate in a closed or partially closed configuration where the side gears 20 and 22 rotate together or partially together (that is, not independently), e.g., at substantially the same speed. The clutch assembly 14 can, for example, be a hydraulic clutch assembly 60 that utilizes pressurized hydraulic fluid that can act on a piston 62 to selectively actuate the clutch pack 50 between the open, closed and partially closed configurations.

With additional reference now to FIGS. 3-6, additional features of the differential gear assembly 12 will be described. The differential case 16 defines a series of holes 70A, 70B and 70C (FIG. 2) formed therethrough. In the example shown, there is a hole for each of the cross-pins 30. Each hole 70A, 70B and 70C further includes a counterbore 72A, 72B and 72C respectively. The counterbores 72A, 72B and 72C have a larger diameter than the holes 70A, 70B and 70C. As will become appreciated, the counterbores 72A, 72B and 72C are configured to receive the respective cross-pins 30A, 30B and 30C and act as a load transfer surface. Further, the transition from the counterbores 72A, 72B and 72C to the holes 70A, 70B and 70C can trap oil inside of the differential case 16 due to centrifugal forces. The holes 70A, 70B and 70C can be an oil path for a journal bearing.

Figure 3:
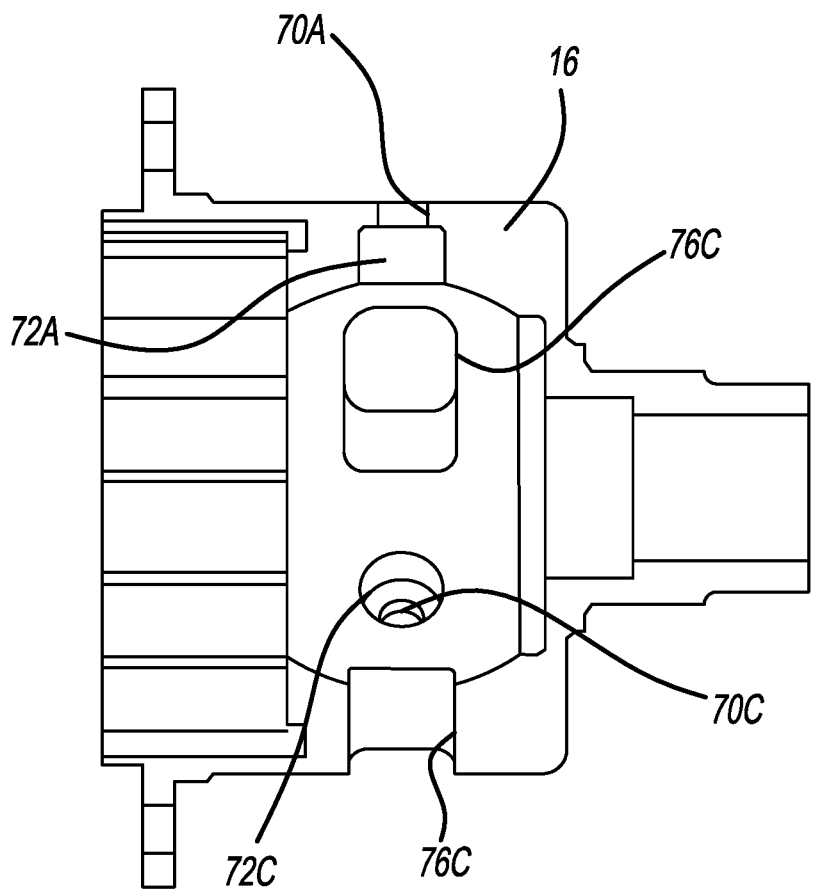
FIG. 3 is sectional view of the differential case of the differential gear mechanism of FIG. 1.
Figure 4:
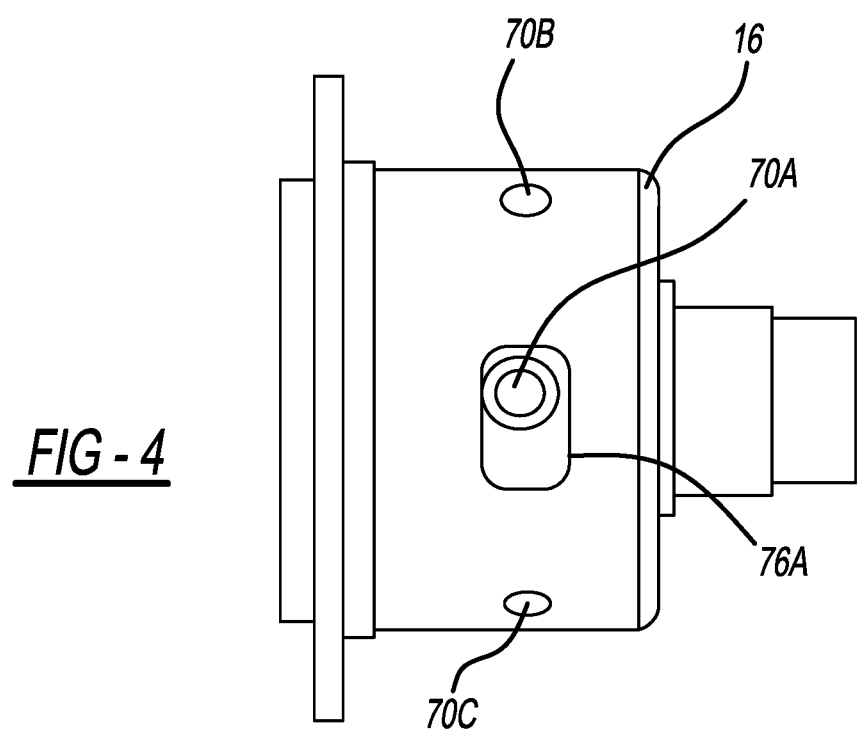
FIG. 4 is a side view of the differential case of FIG. 3.

The differential case 16 further defines a series of windows 76A, 76B and 76C (FIGS. 3 and 4). The windows 76A, 76B and 76C can be located generally at diametrically opposed locations relative to a corresponding series of holes 70A, 70B and 70C. In the example shown, the respective windows 76A, 76B and 76C can be used as an access to the internal cavity of the differential case 16 by a tool when forming the counterbores 72A, 72B and 72C. While the windows 76A, 76B and 76C are shown having a generally rectangular shape, other configurations are contemplated.

Figure 5:
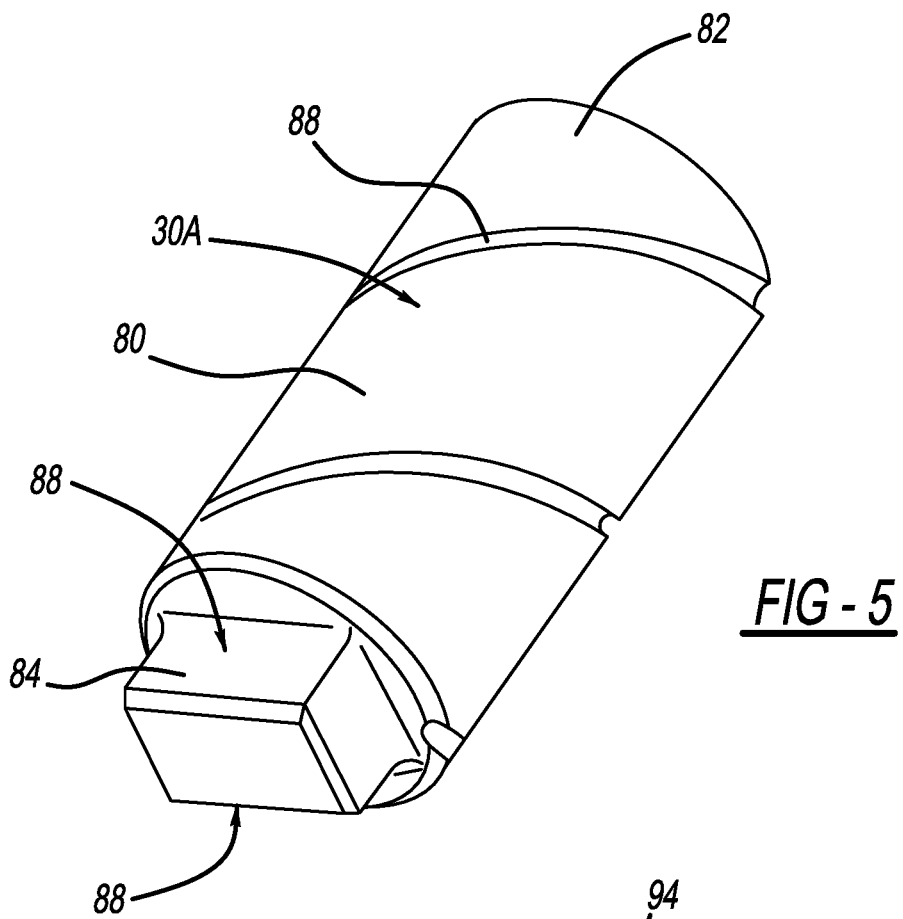
FIG. 5 is a perspective view of a cross-shaft of the differential gear mechanism of FIG. 1.

With particular reference now to FIG. 5, a cross-pin 30A will be described in greater detail. It will be appreciated that the other cross-pins 30B and 30C can be configured similarly. The cross-pin 30A includes a cylindrical pin body 80 that extends between a first end 82 and a second end 84. The cylindrical pin body 80 has a spiral groove 88 formed thereon for oil retention and to maintain an oil film between the pinion gear 40A and the cross-pin 30A. The oil film will minimize friction during relative motion between the pinion gear 40A and the cross-pin 30A. The second end 84 can have a generally rectangular geometry including first parallel sides 88. The first parallel sides 88 can be suitable for mating in a non-rotatable keyed relationship with a center block 90.

Figure 6:
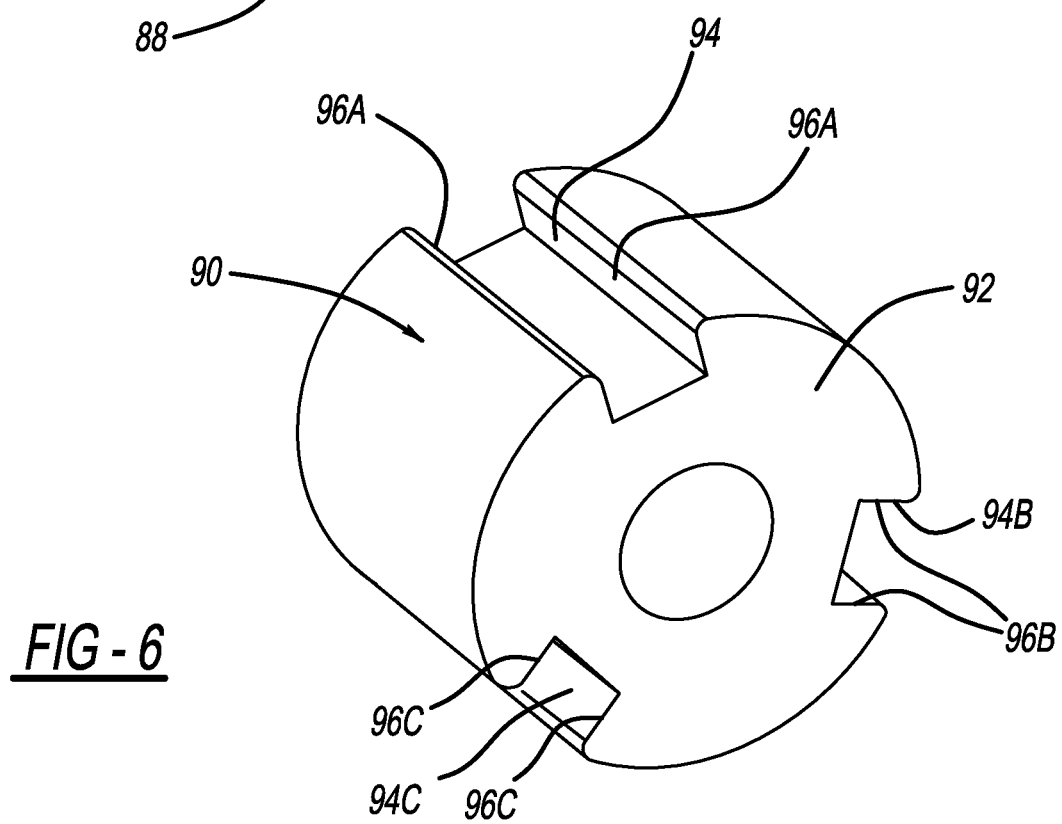
FIG. 6 is a perspective view of a center block of the differential gear mechanism of FIG. 1.

With reference now to FIG. 6, the center block 90 generally includes a cylindrical block body 92 having a series of locating features 94A, 94B and 94C formed thereon. The locating features 94A, 94B and 94C are in the form of slots that extend a length of the cylindrical block body 92. The locating features 94A, 94B and 94C can each be defined in part by opposing side walls 96A, 96B and 96C. The locating features 94A, 94B and 94C are configured to slidingly receive and oppose the second end 84 of the respective cross-pins 30A, 30B and 30C (see also FIG. 2) in a nested position. The second ends 84 are slidingly received by the locating features 94A, 94B and 94C. The center block 90 can be sandwiched between the side gears 20 and 22 and generally retained therebetween. Assembly can be accomplished by slidably passing the center block 90 into location against the side gear 22 while locating the respective second ends 84 along the locating features 94A, 94B and 94C of the center block 90.

The locating features 94A, 94B and 94C prevent rotation of the cross-pins 30A, 30B and 30C as the second ends 84 (see FIG. 5) are keyed into the respective locating features 94A, 94B and 94C. In addition, the respective ends 84 keep the center block 90 from rotating. As the degree of freedom in the rotational direction has been restricted, deflection of the cross-pins 30A, 30B and 30C is limited to a desired value. This will inhibit the cross-shaft contact at the transition between the holes 70A, 70b and 70C and counterbores 72A, 72B and 72C under load such that the respective cross-pins 30A, 30B and 30C are constrained from rotating. Furthermore, the cross-pins 30A, 30B and 30C are supported at both ends.

If the center block 90 and cross-pins 30A, 30B and 30C were one solid unit, the differential gear assembly 12 could not be assembled. Explained further, the case 16 would need to be split such as at the cross-shaft centerline. As a result, extra fasteners would also be required to hold the two separate halves of the case together. In addition, it would be difficult to install the clutch pack 50. By providing a loose center block 90 and three distinct cross-pins 30A, 30B and 30C, along with the counterbores 72A, 72B and 72C, the differential gear assembly 12 can be assembled from the open end on the flange side (see for example the view seen from FIG. 2). Three pinions for higher torque capacity can be incorporated with the instant design as compared to a two pinion design having one larger cross-pin.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A differential gear mechanism comprising:
a differential case defining first, second and third counterbores formed therearound, the differential case rotating around an axis of rotation;
a first and a second side gear rotatably mounted within the differential case, the first and second side gears being co-axially aligned along the axis of rotation;
a first, second and third pinion gear mounted between the first and second side gears, each of the first, second and third pinion gears being rotatably mounted on a respective cross-pin, each cross-pin having a cylindrical pin body that extends between first and second ends, the first, second and third pinion gears intermeshing with the first and second side gears to form a torque transfer arrangement configured for transferring torque between the pinion gears and the first and second side gears to rotate the first and second side gears about the axis of rotation;
a center block having a cylindrical block body that defines a first, second and third locating feature thereon, the center block disposed between the first and second side gears; and
wherein each first end of a respective cross-pin is received by a corresponding counterbore of the differential case, the counterbores acting as a load transfer surface therefor, and each second end is received by a corresponding locating feature of the center block.

2. The differential gear mechanism of claim 1 wherein the first, second and third locating feature comprises first, second and third slots formed into the cylindrical block body, the first, second, and third slots each defined by a pair of opposed side walls.

3. The differential gear mechanism of claim 2 wherein the respective slots each extend an entire axial length of the cylindrical block body between opposed ends of the cylindrical block body.

4. The differential gear mechanism of claim 1 wherein the differential case further defines first, second and third holes coaxially arranged relative to the respective first, second and third counterbores, and
wherein a transition from the first, second, and third counterbores to the respective first, second, and third holes is configured to trap oil inside of the differential case due to centrifugal forces.

5. The differential gear mechanism of claim 4 wherein each of the first, second and third holes extend through an outer surface of the differential case and are disposed radially outward of the respective first, second, and third counterbores.

6. The differential gear mechanism of claim 1 wherein the torque transfer arrangement is configured for allowing the first and second side gears to rotate at different rotational speeds with respect to one another about the axis of rotation.

7. The differential gear mechanism of claim 1 wherein each cylindrical pin body has a spiral groove formed thereon.

8. The differential gear mechanism of claim 4 wherein the differential case further defines a first, a second and a third window positioned at a diametrically opposed location from a corresponding first, second and third hole in the differential case.

9. The differential gear mechanism of claim 1 wherein the locating features in the center block are each defined in part by opposing side walls that oppose the respective second ends of the cross-pins in a non-rotatably, keyed relationship.

10. The differential gear mechanism of claim 1 wherein each cross-pin is separate and distinct from the center block.

11. The differential gear mechanism of claim 1 further comprising a clutch assembly movable between an open configuration to allow the side gears to rotate independently from each other, and a closed or partially closed configuration where the side gears rotate together or partially together at substantially the same speed.

12. A differential gear mechanism comprising:
a differential case defining first, second and third holes and corresponding first, second and third counterbores formed therearound, the differential case rotating around an axis of rotation;
a first and a second side gear rotatably mounted within the differential case, the first and second side gears being co-axially aligned along the axis of rotation;
a first, second and third pinion gear mounted between the first and second side gears, each of the first, second and third pinion gears being rotatably mounted on a respective cross-shaft, each cross-shaft having a cylindrical pin body that extends between first and second ends, the first, second and third pinion gears intermeshing with the first and second side gears to form a torque transfer arrangement configured for transferring torque between the pinion gears and the first and second side gears to rotate the first and second side gears about the axis of rotation, the torque transfer arrangement also being configured for allowing the first and second side gears to rotate at different rotational speeds with respect to one another about the axis of rotation;
a center block having a cylindrical block body that defines a first, second and third slot thereon, the center block disposed between the first and second side gears; and
wherein each first end of a respective cross-shaft is received by a corresponding counterbore of the differential case, the counterbores acting as a load transfer surface therefor, and each second end is received by a corresponding slot of the center block.

13. The differential gear mechanism of claim 12 wherein each cylindrical pin body has a spiral groove formed thereon.

14. The differential gear mechanism of claim 12 wherein the differential case further defines a first, a second and a third window positioned at a diametrically opposed location from one of the corresponding first, second and third holes in the differential case, the first, second and third windows configured to allow tool access to the differential case during formation of the respective first, second and third counterbores.

15. The differential gear mechanism of claim 12 wherein the slots in the center block are each defined in part by opposing side walls that oppose the respective second ends of the cross-shafts, wherein the slots each extend an entire axial length of the cylindrical block body.

16. The differential gear mechanism of claim 12 wherein the cross-shafts are non-rotatably keyed to the center block at the respective slots.

17. The differential gear mechanism of claim 12 wherein each of the first, second and third holes extend through an outer surface of the differential case.

18. The differential gear mechanism of claim 12 wherein each respective second end has a generally rectangular geometry.

19. A differential gear mechanism comprising:
a differential case defining first, second and third holes disposed radially outward of corresponding first, second and third counterbores, the differential case rotating around an axis of rotation;
a first and a second side gear rotatably mounted within the differential case, the first and second side gears being co-axially aligned along the axis of rotation;
a first, second and third pinion gear mounted between the first and second side gears, each of the first, second and third pinion gears being rotatably mounted on a respective cross-shaft, each cross-shaft having a cylindrical pin body that extends between first and second ends, the first, second and third pinion gears intermeshing with the first and second side gears to form a torque transfer arrangement configured for transferring torque between the pinion gears and the first and second side gears to rotate the first and second side gears about the axis of rotation;
a center block having a cylindrical block body that defines first, second and third axially extending slots thereon, each of the first, second, and third axially extending slots defined by a pair of opposed walls; and
wherein each first end of a respective cross-shaft is received by a corresponding counterbore of the differential case, the counterbores acting as a load transfer surface therefor, and each second end is received by a corresponding axially extending slot of the center block in a non-rotatably, keyed relationship.

* * * * *